United States Patent Office

2,808,337
Patented Oct. 1, 1957

2,808,337

ALGINATE COMPOSITION FOR MAKING MILK PUDDINGS AND PROCESS FOR MAKING THE SAME

Kenneth F. Gibsen, San Diego, Calif., assignor to Kelco Company, San Diego, Calif., a corporation of Delaware No Drawing. Application April 20, 1955, Serial No. 502,729

21 Claims. (Cl. 99—131)

This invention relates to edible puddings or gels and to an alginate composition useful in making them.

Milk pudding powders are widely sold and used in the household for the rapid production of a nutritious and desirable dessert. These powders contain chocolate or other taste-imparting ingredient, vanillin or other flavoring and salt, together with a gelatinizing agent which, when dissolved in milk, causes the milk to gelatinize on standing. This gelatinizing agent is usually either starch or rennet.

The essential requirements in such a product are that the gelatinizing agent should be substantially tasteless, that the product be readily soluble without forming lumps or granules, and that the finished pudding, after setting, be at once firm and tender.

Attempts have been made to use the soluble salts of alginic acid as the gelatinizing agent in milk puddings, but various difficulties have been encountered, such as imperfect solubility, development of a granular structure, lack of firmness and the like and, so far as I am aware, the alginic salts have not heretofore been used with success in the manufacture of milk puddings.

I have discovered that highly satisfactory and desirable milk puddings may be prepared by the use of a composition containing a water-soluble alkali metal alginate, such as sodium alginate, a mild alkali such as sodium carbonate, and a small quantity of a calcium salt.

I have also discovered that a mere dry blend or mixture of the above components is not efficacious, but that the composition must be prepared in a specific manner as described below.

Wet fibrous alginic acid, containing not more than about 50% solids and preferably 15% to 25% solids and finely comminuted, is suspended in a quantity of a water miscible lower aliphatic alcohol, (e. g., methyl, ethyl or isopropyl), ranging upwardly from 65% by volume of the water content of the acid. To this suspension is added from 1 to about 3 equivalents of dry, powdered sodium carbonate and the mixture is stirred, preferably without heating, until reaction is complete.

A calcium salt in finely powdered form is then added and carefully blended with the aforesaid suspension, after which excess alcohol is drained off and the composition dried and finely comminuted. A wide variety of calcium salts may be used for this purpose, for example, the acetate, carbonate, chloride, citrate, lactate and the phosphates. Calcium hydroxide is not suitable.

The quantity of sodium carbonate or other mild alkali metal base such as potassium carbonate, sodium bicarbonate or potassium bicarbonate, used in the reaction has some latitude but it should always be in excess of the theoretical combining weight, i. e., the quantity required to neutralize the alginic acid employed.

Tricalcium phosphate has been used with good results, as the calcium salt, with as little as 1.1 equivalents. In using calcium citrate and carbonate the minimum appears to be about 1.5 equivalents, and with the chloride about 2.2 equivalents. The maximum quantity for best results appears to be about 3 equivalents, an excess producing a weak gel or inhibiting gel formation.

The quantity of calcium salt which may be used in accordance with my invention to produce a gelatinizing agent is limited at the lower end of the scale in all cases to an amount of calcium salt expressed as calcium in percent by weight of said alginic acid of at least 4%. The upper limit of the calcium salt varies with the reactivity of the calcium salt employed. These limitations are illustrated in the following experiments in which equal quantities of the product, i. e., 1 gram per 100 ml., were dissolved in hot milk, the solution allowed to cool and the firmness of the resulting gel observed. These observations are set forth in the table below:

| Calcium Salt Used | Quantity Salt in Weight Percent of Acid | Expressed as Percent Calcium | Quality of Gel Product |
|---|---|---|---|
| Acetate | 20 | 4.6 | Poor. |
|  | 30 | 6.8 | Good. |
|  | 40 | 9.1 | Do. |
|  | 44 | 10.0 | Do. |
|  | 48 | 11.0 | Do. |
|  | 53 | 12.0 | Weak, grainy. |
|  | 80 | 18.0 | None. |
| Carbonate | 10 | 4.0 | Poor. |
|  | 22 | 8.8 | Good. |
|  | 30 | 12.0 | Do. |
|  | 44 | 17.6 | Do. |
|  | 50 | 20.0 | Do. |
|  | 70 | 28.0 | Fair. |
| Chloride | 11 | 4.0 | Poor. |
|  | 17 | 6.0 | Good. |
|  | 22 | 8.0 | Do. |
|  | 25 | 9.0 | Do. |
|  | 28 | 10.0 | Do. |
|  | 34 | 12.0 | Weak, grainy. |
| Citrate | 21 | 4.4 | Poor. |
|  | 31.5 | 6.7 | Good. |
|  | 42 | 8.9 | Do. |
|  | 52.5 | 11.1 | Do. |
|  | 63 | 13.3 | Do. |
|  | 73.5 | 15.5 | Fair. |
|  | 84 | 17.7 | Do. |
| Lactate | 34 | 4.4 | Poor. |
|  | 51 | 6.6 | Good. |
|  | 68 | 8.8 | Do. |
|  | 102 | 13.2 | No gel. |
|  | 136 | 17.7 | Do. |

These figures indicate a lower average limit for the salt component, expressed as calcium in percent by weight of the alginic acid, of about 4.5%, while the upper limit for the acetate, chloride or lactate is about 12%, for the carbonate about 25%, and for the citrate about 18%.

While a gel is produced by the solution of either of the above compositions in hot milk, the resultant product is substantially tasteless and flavorless. The product will therefore be prepared for household use by blending with desired flavoring components. Solely by way of example, a pudding mixture may consist of:

| | |
|---|---|
| Algin composition | 4.25 gms. |
| Sugar | 66.75 gms. |
| Cocoa | 13 gms. |
| Salt | 1 gms. |
| Vanillin | 0.2 gms. |
| | 85.2 gms. (3 oz.) |

In the use of this blend, or any blend of the composition with desired flavoring components, the milk (two cups for this blend) may be heated to boiling, withdrawn from the fire and the blend stirred in and dissolved, whereupon gelling will occur upon standing. Ordinarily, the hot liquid mix will be poured into dessert cups, pie shell, etc., and allowed to cool. The strength or firmness of the resultant pudding may be increased by using more of the alginate composition in the formula. Ordinarily, this concentration will range from about 0.75 to 1.25% of the weight of the milk.

This alginate composition has also been found useful in the preparation of cold milk puddings of the so-called instant type. In this case, an additional buffering agent such as tetrasodium pyrophosphate and additional calcium salts such as calcium gluconate must be blended into the pudding mix. An example of a pudding mix formula for producing this type of pudding is as follows:

| | |
|---|---|
| Alginate composition | 4 gms. |
| Sugar | 82 gms. |
| Cocoa | 20 gms. |
| Calcium gluconate | 4 gms. |
| Tetrasodium pyrophosphate (anhydrous) | 2 gms. |
| Salt | 1 gms. |
| Vanillin | 0.2 gms. |
| | 113.2 gms. (4 oz.) |

For preparing the instant pudding, the 4 ounce package of pudding mix described above is added to two cups of cold milk, and stirred with a hand rotary beater or an electric mixer using medium speed. After 3 or 4 minutes the mixture will be smooth and thickened but easily pourable. This may then be poured into dessert cups and after 15 minutes or longer, a desirable gel body is obtained. The firmness of the gel may be increased or decreased by varying the concentration of alignate composition, calcium gluconate or sodium phosphate buffer.

Other calcium salts that may be used in place of the calcium gluconate to produce a mix useful in the preparation of cold milk puddings are calcium lactate or calcium acetate. Calcium lactate has been found to be suitable in amounts ranging from 2.00 gms. to 2.50 gms. in the above formula. Calcium acetate has been found to be suitable in even smaller quantities, i. e., 1.25 gms. to 1.75 gms. Tetrasodium pyrophosphate is used in an amount of about ⅓ to ⅔ by weight of the added calcium gluconate, calcium lactate or calcium acetate.

The alginic compositions above described are all on the alkaline side of the scale. The hydrogen ion concentration in a 2% aqueous solution ranges from pH 9.0 to pH 10.5, and preferably 9.5 to 10.2. The solutions thereof in milk, however, are close to neutral. The pH value is in the range from 6.8 to 7.9.

It is understood that the examples are given by way of illustration only, and are not to be considered as a limitation on the scope of the invention as defined in the appended claims.

I claim:

1. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, and an amount of calcium salt expressed as calcium in percent of weight of said alginic acid of at least 4%.

2. The process of producing a new and useful gelatinizing agent, particularly suitable for use in a milk pudding, comprising suspending a wet finely comminuted fibrous alginic acid having 15% to 25% solids in a quantity of a water miscible lower aliphatic alcohol in an amount upward from 65% by volume of the water content of said acid, admixing from about 1 to about 3 equivalents of sodium carbonate therewith, and an amount of a calcium salt expressed as calcium in percent of weight of said alginic acid of at least 4%, but not more than an amount sufficient to give the resulting product good gelatinizing properties when used as a milk pudding additive.

3. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, and admixing from about 1 to about 3 equivalents of sodium carbonate therewith, blending with the suspension resulting from the aforesaid an amount of a calcium salt expressed as calcium in percent of weight of said alginic acid of at least 4%, draining off the excess alcohol, drying and finely comminuting the resulting composition.

4. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, and an amount of calcium acetate expressed as calcium in percent of weight of said alginic acid of 6% to 12%.

5. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, and an amount of calcium carbonate expressed as calcium in percent of weight of said alginic acid of 8% to 25%.

6. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, and an amount of calcium chloride expressed as calcium in percent of weight of said alginic acid of 6% to 12%.

7. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, and an amount of calcium citrate expressed as calcium in percent of weight of said alginic acid of 6% to 18%.

8. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, and an amount of calcium lactate expressed as calcium in percent of weight of said alginic acid of 6% to 12%.

9. The process of producing a new and useful gelatinizing agent, particularly suitable for use in a milk pudding, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of a mild alkali metal base therewith, and an amount of a calcium salt expressed as calcium in percent of weight of said alginic acid of at least 4%.

10. The process of producing a new and useful gelatinizing agent, particularly suitable for producing a milk pudding from cold milk, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of a mild alkali metal base therewith, blending with the suspension resulting from the aforesaid an amount of a calcium salt expressed as calcium in percent of weight of said alginic acid of at least 4%, draining off the excess alcohol, drying the resulting alginate composition, admixing about an equal amount by weight of said composition of a calcium salt selected from the group consisting of calcium gluconate, calcium lactate and calcium acetate, and about 1/3 to 2/3 by weight of said added calcium salt of tetrasodium pyrophosphate.

11. The process of producing a new and useful gelatinizing agent, particularly suitable for producing a milk pudding from cold milk, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, blending with the suspension resulting from the aforesaid an amount of calcium acetate expressed as calcium in percent of weight of said alginic acid of 6% to 12%, draining off the excess alcohol, drying the resulting alginate composition, admixing about an equal amount by weight of said composition of a calcium salt selected from the group consisting of calcium gluconate, calcium lactate and calcium acetate, and about 1/3 to 2/3 by weight of said added calcium salt of tetrasodium pyrophosphate.

12. The process of producing a new and useful gelatinizing agent, particularly suitable for producing a milk pudding from cold milk, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, blending with the suspension resulting from the aforesaid an amount of calcium carbonate expressed as calcium in percent of weight of said alginic acid of 8% to 25%, draining off the excess alcohol, drying the resulting alginate composition, admixing about an equal amount by weight of said composition of a calcium salt selected from the group consisting of calcium gluconate, calcium lactate and calcium acetate, and about 1/3 to 2/3 by weight of said added calcium salt of tetrasodium pyrophosphate.

13. The process of producing a new and useful gelatinizing agent, particularly suitable for producing a milk pudding from cold milk, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, blending with the suspension resulting from the aforesaid an amount of calcium chloride expressed as calcium in percent of weight of said alginic acid of 6% to 12%, draining off the excess alcohol, drying the resulting alginate composition, admixing about an equal amount by weight of said composition of a calcium salt selected from the group consisting of calcium gluconate, calcium lactate and calcium acetate, and about 1/3 to 2/3 by weight of said added calcium salt of tetrasodium pyrophosphate.

14. The process of producing a new and useful gelatinizing agent, particularly suitable for producing a milk pudding from cold milk, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, blending with the suspension resulting from the aforesaid an amount of calcium citrate expressed as calcium in percent of weight of said alginic acid of 6% to 18%, draining off the excess alcohol, drying the resulting alginate composition, admixing about an equal amount by weight of said composition of a calcium salt selected from the group consisting of calcium gluconate, calcium lactate and calcium acetate, and about 1/3 to 2/3 by weight of said added calcium salt of tetrasodium pyrophosphate.

15. The process of producing a new and useful gelatinizing agent, particularly suitable for producing a milk pudding from cold milk, comprising suspending a wet fibrous alginic acid having not more than 50% solids in a quantity of a water miscible lower aliphatic alcohol in an amount upward from 65% by volume of the water content of said acid, admixing from about 1 to about 3 equivalents of sodium carbonate therewith, blending with the suspension resulting from the aforesaid an amount of calcium lactate expressed as calcium in percent of weight of said alginic acid of 6% to 12%, draining off the excess alcohol, drying the resulting alginate composition, admixing about an equal amount by weight of said composition of a calcium salt selected from the group consisting of calcium gluconate, calcium lactate and calcium acetate, and about 1/3 to 2/3 by weight of said added calcium salt of tetrasodium pyrophosphate.

16. A comminuted solid gelatinizing agent suitable for use in a milk pudding comprising the reaction product of a wet fibrous alginic acid suspended in a lower aliphatic alcohol, a mild alkali metal base in an amount of about 1 to about 3 equivalents of said acid, and an amount of a calcium salt expressed as calcium in percent of weight of said alginic acid of at least 4%.

17. A comminuted solid gelatinizing agent suitable for use in a milk pudding comprising the reaction product of a wet fibrous alginic acid suspended in a lower aliphatic alcohol, a mild alkali metal base in an amount of about 1 to about 3 equivalents of said acid, and an amount of calcium acetate expressed as calcium in percent of weight of said alginic acid of 6% to 12%.

18. A comminuted solid gelatinizing agent suitable for use in a milk pudding comprising the reaction product of a wet fibrous alginic acid suspended in a lower aliphatic alcohol, a mild alkali metal base in an amount of about 1 to about 3 equivalents of said acid, and an amount of calcium carbonate expressed as calcium in percent of weight of said alginic acid of 8% to 25%.

19. A comminuted solid gelatinizing agent suitable for use in a milk pudding comprising the reaction product of a wet fibrous alginic acid suspended in a lower aliphatic alcohol, a mild alkali metal base in an amount of about 1 to about 3 equivalents of said acid, and an amount of calcium chloride expressed as calcium in percent of weight of said alginic acid of 6% to 12%.

20. A comminuted solid gelatinizing agent suitable for use in a milk pudding comprising the reaction product of a wet fibrous alginic acid suspended in a lower aliphatic alcohol, a mild alkali metal base in an amount of about 1 to about 3 equivalents of said acid, and an amount of calcium citrate expressed as calcium in percent of weight of said alginic acid of 6% to 18%.

21. A comminuted solid gelatinizing agent suitable for use in a milk pudding comprising the reaction product of a wet fibrous alginic acid suspended in a lower aliphatic alcohol, a mild alkali metal base in an amount of about 1 to about 3 equivalents of said acid, and an amount of calcium lactate expressed as calcium in percent of weight of said alginic acid of 6% to 12%.

References Cited in the file of this patent

UNITED STATES PATENTS

| | | |
|---|---|---|
| 2,441,729 | Steiner | May 18, 1948 |
| 2,536,708 | Angermeier | Jan. 2, 1951 |

FOREIGN PATENTS

| | | |
|---|---|---|
| 319,333 | Great Britain | Dec. 11, 1930 |